United States Patent
Ko et al.

(10) Patent No.: US 9,585,127 B2
(45) Date of Patent: *Feb. 28, 2017

(54) METHOD AND APPARATUS FOR MULTIPLEXING CONTROL INFORMATION AND DATA, AND FOR TRANSMITTING THE MULTIPLEXED CONTROL INFORMATION AND DATA IN A MIMO WIRELESS COMMUNICATION SYSTEM

(71) Applicant: LG ELECTRONICS INC., Seoul (KR)

(72) Inventors: Hyunsoo Ko, Anyang-si (KR); Moonil Lee, Anyang-si (KR); Jaehoon Chung, Anyang-si (KR); Seunghee Han, Anyang-si (KR); Jiwoong Jang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,858

(22) Filed: Sep. 3, 2015

(65) Prior Publication Data

US 2015/0382337 A1 Dec. 31, 2015

Related U.S. Application Data

(63) Continuation of application No. 13/643,516, filed as application No. PCT/KR2011/003557 on May 13, 2011, now Pat. No. 9,160,486.

(Continued)

(51) Int. Cl.
*G01R 31/08* (2006.01)
*H04L 5/14* (2006.01)
(Continued)

(52) U.S. Cl.
CPC ...... *H04W 72/0406* (2013.01); *H04B 7/0413* (2013.01); *H04B 7/2628* (2013.01);
(Continued)

(58) Field of Classification Search
CPC ........ H04B 7/2628; H04B 2201/70701; H04B 2201/70702; H04B 2201/70718; H04L 1/1671; H04L 1/0057
See application file for complete search history.

(56) References Cited

U.S. PATENT DOCUMENTS 8,625,554 B2    1/2014  Zhang et al.
2008/0136610 A1*  6/2008  Limin ................. B60R 11/0235
                                                340/425.5

(Continued)

OTHER PUBLICATIONS

LTE; Evolved universal terrestrial radio access (U-UTRA), Multiplexing and channel coding (3GPP TS 36.212 V8.6.0 Release 8).

(Continued)

*Primary Examiner* — Brian Roberts
*Assistant Examiner* — Abu-Sayeed Haque
(74) *Attorney, Agent, or Firm* — Dentons US LLP

(57) ABSTRACT

The present invention relates to a wireless communication system, and more particularly, to a method and apparatus for transmitting uplink control information in a wireless communication system. A method for multiplexing uplink control information and uplink data and for transmitting the multiplexed uplink control information and uplink data according to one embodiment of the present invention comprises the following steps: encoding a first transmission block and a second transmission block to generate a first codeword and a second codeword; mapping the first codeword and the second codeword to one or more layers, respectively; and transmitting, via one or more antenna ports, each layer to which the first codeword and the second codeword are mapped, wherein the uplink control informa- (Continued)

tion is multiplexed only to either the first transmission block or to the second transmission block.

15 Claims, 10 Drawing Sheets

Related U.S. Application Data

(60) Provisional application No. 61/334,558, filed on May 13, 2010, provisional application No. 61/346,037, filed on May 19, 2010, provisional application No. 61/356,048, filed on Jun. 18, 2010.

(51) Int. Cl.
| | |
|---|---|
| *H04B 7/00* | (2006.01) |
| *H04J 3/16* | (2006.01) |
| *H04W 72/04* | (2009.01) |
| *H04B 7/26* | (2006.01) |
| *H04B 7/04* | (2006.01) |
| *H04L 1/00* | (2006.01) |
| *H04L 1/06* | (2006.01) |
| *H04L 25/03* | (2006.01) |
| *H04L 1/16* | (2006.01) |
| *H04W 72/06* | (2009.01) |
| *H04L 5/00* | (2006.01) |
| *H04W 88/08* | (2009.01) |

(52) U.S. Cl.
CPC .......... *H04L 1/0026* (2013.01); *H04L 1/0041* (2013.01); *H04L 1/0057* (2013.01); *H04L 1/0061* (2013.01); *H04L 1/0073* (2013.01); *H04L 1/06* (2013.01); *H04L 1/1671* (2013.01); *H04L 5/0053* (2013.01); *H04L 25/03343* (2013.01); *H04W 72/06* (2013.01); *H04B 2201/70701* (2013.01); *H04L 5/0023* (2013.01); *H04L 2025/03414* (2013.01); *H04L 2025/03426* (2013.01); *H04W 88/08* (2013.01)

(56) References Cited

U.S. PATENT DOCUMENTS

| | | |
|---|---|---|
| 2008/0287155 A1 | 11/2008 | Xu et al. |
| 2009/0129259 A1 | 5/2009 | Malladi et al. |
| 2009/0316626 A1 | 12/2009 | Lee et al. |
| 2009/0323592 A1 | 12/2009 | Terry |
| 2010/0023830 A1 | 1/2010 | Wengerter et al. |
| 2010/0027450 A1 | 2/2010 | Montojo et al. |
| 2010/0098012 A1 | 4/2010 | Bala et al. |
| 2010/0195614 A1 | 8/2010 | Nimbalker et al. |
| 2010/0208689 A1 | 8/2010 | Terry |
| 2010/0215109 A1 | 8/2010 | Onggosanusi et al. |
| 2010/0238823 A1 | 9/2010 | Chen et al. |
| 2010/0239035 A1* | 9/2010 | Blankenship ......... H04L 1/0656 375/260 |
| 2010/0239040 A1* | 9/2010 | Beluri ................. H04B 7/0417 375/267 |
| 2010/0303034 A1 | 12/2010 | Chen et al. |
| 2011/0085508 A1 | 4/2011 | Wengerter et al. |
| 2011/0103498 A1* | 5/2011 | Chen .................. H04L 1/06 375/260 |
| 2011/0141959 A1 | 6/2011 | Damnjanovic et al. |
| 2012/0014242 A1 | 1/2012 | Kim et al. |
| 2013/0028203 A1 | 1/2013 | Hooli et al. |

OTHER PUBLICATIONS

A. Ghosh et al., "Uplink Control Channel Design i 3GPP LT," The 18th Annual IEEE International Symposium on Personal, Indoor and Mobile Radio Communications (PIMRC '07), pp. 1-5, Sep. 7, 2007.

* cited by examiner (a)

(b)

METHOD AND APPARATUS FOR MULTIPLEXING CONTROL INFORMATION AND DATA, AND FOR TRANSMITTING THE MULTIPLEXED CONTROL INFORMATION AND DATA IN A MIMO WIRELESS COMMUNICATION SYSTEM

This application is a continuation application of U.S. patent application Ser. No. 13/643,516 filed Oct. 25, 2012, which is a National Stage Entry of International Application No. PCT/KR2011/003557 filed May 13, 2011, which claims priority to U.S. Provisional Application Nos. 61/334,558 filed May 13, 2010, 61/346,037 filed May 19, 2010, and 61/356,048 filed Jun. 18, 2010, all of which are incorporated herein by reference.

TECHNICAL FIELD

The following description relates to a wireless communication system and more particularly to a method and apparatus for multiplexing and transmitting control information and data in a MIMO wireless communication system.

BACKGROUND ART

Multi-antenna transmission technology, which is also referred to as Multi-Input Multi-Output (MIMO) technology, can apply MIMO technology that uses multiple transmit antennas and multiple receive antennas to improve data transmission and reception efficiencies. MIMO technology may include spatial multiplexing, transmit diversity, and beamforming. A MIMO channel matrix which is defined according to the number of receive antennas and the number of transmit antennas may be decomposed into a number of independent channels, each of which is referred to as a layer or stream. The number of layers or streams or the spatial multiplexing rate is referred to as a rank.

While the conventional 3GPP LTE system (for example, 3GPP LTE release 8 or 9) supports uplink transmission through a single antenna, a 3GPP LTE-A system (for example, 3GPP LTE release 10), which is an evolution of the 3GPP LTE standard, is under discussion to support uplink transmission through up to 4 transmit antennas.

On the other hand, to efficiently perform downlink multi-antenna transmission, a feedback to a downlink channel may be transmitted from a receiving end (for example, a user equipment) to a transmitting end (for example, a base station). Such feedback information may include a rank indicator (RI) and channel quality information (CQI) of a downlink channel. A Hybrid Automatic Repeat reQuest (HARQ)-Acknowledgement/Negative Acknowledgement (ACK/NACK) which indicates whether or not decoding of downlink data is successful may also be transmitted from the downlink receiving end to the downlink transmitting end. Information such as RI, CQI, and HARQ ACK/NACK information may be collectively referred to as uplink control information (UCI).

UCI may be transmitted through a physical uplink control channel (PUCCH) or a physical uplink shared channel (PUSCH). When UCI is transmitted through a PUSCH, the UCI and uplink data may be multiplexed and transmitted.

DISCLOSURE

Technical Problem

Since the conventional system takes into consideration only single layer transmission when UCI is multiplexed and transmitted with uplink data, to support uplink multi-antenna transmission as described above, there is a need to newly define a method for multiplexing uplink data and UCI for multi-layer transmission.

An object of the present invention is to provide a method for multiplexing UCI and uplink data when one or more transport blocks (TBs) are transmitted in uplink.

Objects of the present invention are not limited to those described above and other objects will be clearly understood by a person having ordinary knowledge in the art from the following description.

Technical Solution

A method for multiplexing and transmitting uplink control information with uplink data in a wireless communication system according to an embodiment of the present invention in order to achieve the above objects includes encoding a first transport block and a second transport block to generate a first codeword and a second codeword, mapping each of the first and second codewords to at least one layer, and transmitting each of the at least one layer to which the first and second codewords are mapped through at least one antenna port, wherein the uplink control information is multiplexed with one of the first and second transport blocks.

A transmitter for multiplexing and transmitting uplink control information with uplink data in a wireless communication system according to another embodiment of the present invention in order to achieve the above objects includes a transmission module for transmitting an uplink signal to an uplink receiver, a reception module for receiving a downlink signal from the uplink receiver, and a processor for controlling the transmitter including the reception module and the transmission module, the processor being configured for encoding a first transport block and a second transport block to generate a first codeword and a second codeword, mapping each of the first and second codewords to at least one layer, and transmitting, using the transmission module, each of the at least one layer to which the first and second codewords are mapped through at least one antenna port, wherein the uplink control information is multiplexed with one of the first and second transport blocks.

The following features may be commonly applied to the above embodiments of the present invention.

The transport block with which the uplink control information is multiplexed may be a transport block which is assigned a higher MCS level from among the first and second transport blocks.

The transport block with which the uplink control information is multiplexed may be a transport block having a lower modulation order from among the first and second transport blocks.

The transport block with which the uplink control information is multiplexed may be a transport block which is modulated according to a Quadrature Phase Shift Keying (QPSK) scheme from among the first and second transport blocks.

The uplink control information may be replicated in at least one layer to which a codeword to which the transport block with which the uplink control information is multiplexed is mapped is mapped.

The uplink control information may be spread in at least one layer to which a codeword to which the transport block with which the uplink control information is multiplexed is mapped is mapped.

The uplink control information may include at least one of rank information, channel quality information, and Hybrid Automatic Repeat reQuest (HARQ)-Acknowledgement/Negative Acknowledgement (ACK/NACK) information.

It is to be understood that both the foregoing general description and the following detailed description of the present invention are exemplary and explanatory and are intended to provide further explanation of the invention as claimed.

Advantageous Effects

According to the present invention, it is possible to provide a method for multiplexing UCI and uplink data when one or more transport blocks (TBs) are transmitted in uplink.

Advantages of the present invention are not limited to those described above and other advantages will be clearly understood by a person having ordinary knowledge in the art from the following description.

DESCRIPTION OF DRAWINGS

The accompanying drawings, which are included to provide a further understanding of the invention, illustrate various embodiments of the invention and together with the description serve to explain the principle of the invention. In the drawings.

BEST MODE

Figure 1:
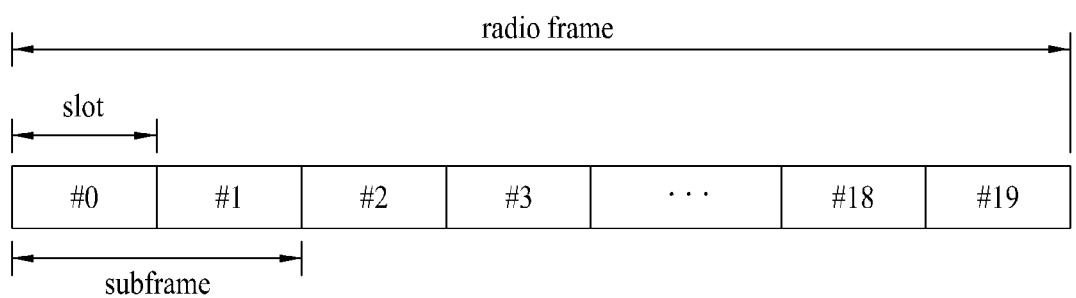
FIG. 1 illustrates the structure of a radio frame used in a 3GPP LTE system.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", or "access point". The term "relay" may be replaced with another term "Relay Node (RN)" or "Relay Station (RS)". The term "terminal" may also be replaced with another term such as "User Equipment (UE)", "Mobile Station (MS)", "Mobile Subscriber Station (MSS)", or "Subscriber Station (SS)". The term "stationary terminal" may also be replaced with another term such as "notebook" or "laptop".

Specific terms used in the following description are provided for better understanding of the present invention and can be replaced with other terms without departing from the spirit of the present invention.

In some instances, known structures and devices are omitted or shown in block diagram form, focusing on important features of the structures and devices, so as not to obscure the concept of the present invention. The same reference numbers will be used throughout this specification to refer to the same or like parts.

The embodiments of the present invention can be supported by standard documents of at least one of the IEEE 802 system, the 3GPP system, the 3GPP LTE system, the LTE-Advanced (LTE-A) system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents.

Technologies described below can be used in various wireless access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system. CDMA may be implemented with a radio technology such as Universal Terrestrial Radio Access (UTRA) or CDMA2000. TDMA may be implemented with a radio technology such as Global System for Mobile communication (GSM), General Packet Radio Service (GPRS), or Enhanced Data rates for GSM Evolution (EDGE). OFDMA may be implemented with a radio technology such as IEEE 802.11 (Wi-Fi), IEEE 802.16 (WiMAX), IEEE 802.20, or Evolved-UTRA (E-UTRA). UTRA is a part of Universal Mobile Telecommunication System (UMTS). 3rd Generation Partnership Project (3GPP) Long Term Evolution (LTE) is a part of Evolved-UMTS (E-UMTS) that uses E-UTRA. 3GPP LTE employs OFDMA for downlink and employs SC-FDMA for uplink. LTE-Advanced (LTE-A) is an evolution of 3GPP LTE. WiMAX can be explained by IEEE 802.16e standard (WirelessMAN-OFDMA Reference System) and advanced IEEE 802.16m standard (WirelessMAN-OFDMA advanced system). Although the present invention will be described below mainly with reference to 3GPP LTE and 3GPP LTE-A systems for the sake of clarification, the technical spirit of the present invention is not limited to the 3GPP LTE and LTE-A systems. For example, the technical spirit of the present invention may also be applied to an OFDM based mobile communication system (for example, an IEEE802.16m or 802.16x based system) other than the LTE-A system.

FIG. 1 illustrates the structure of a radio frame used in the 3GPP LTE system. A radio frame includes 10 subframes and each subframe includes 2 slots in the time domain. A unit time in which one subframe is transmitted is defined as a Transmission Time Interval (TTI). For example, one subframe may have a length of 1 ms and one slot may have a length of 0.5 ms. One slot may include a plurality of OFDM symbols in the time domain. Because the 3GPP LTE system uses OFDMA in downlink, an OFDM symbol represents one symbol period. One symbol may be referred to as an SC-FDMA symbol or a symbol period in uplink. A Resource Block (RB) is a resource allocation unit which includes a plurality of consecutive subcarriers in a slot. This radio frame structure is purely exemplary. Thus, the number of subframes included in a radio frame, the number of slots included in a subframe, or the number of OFDM symbols included in a slot may vary in various ways.

Figure 2:
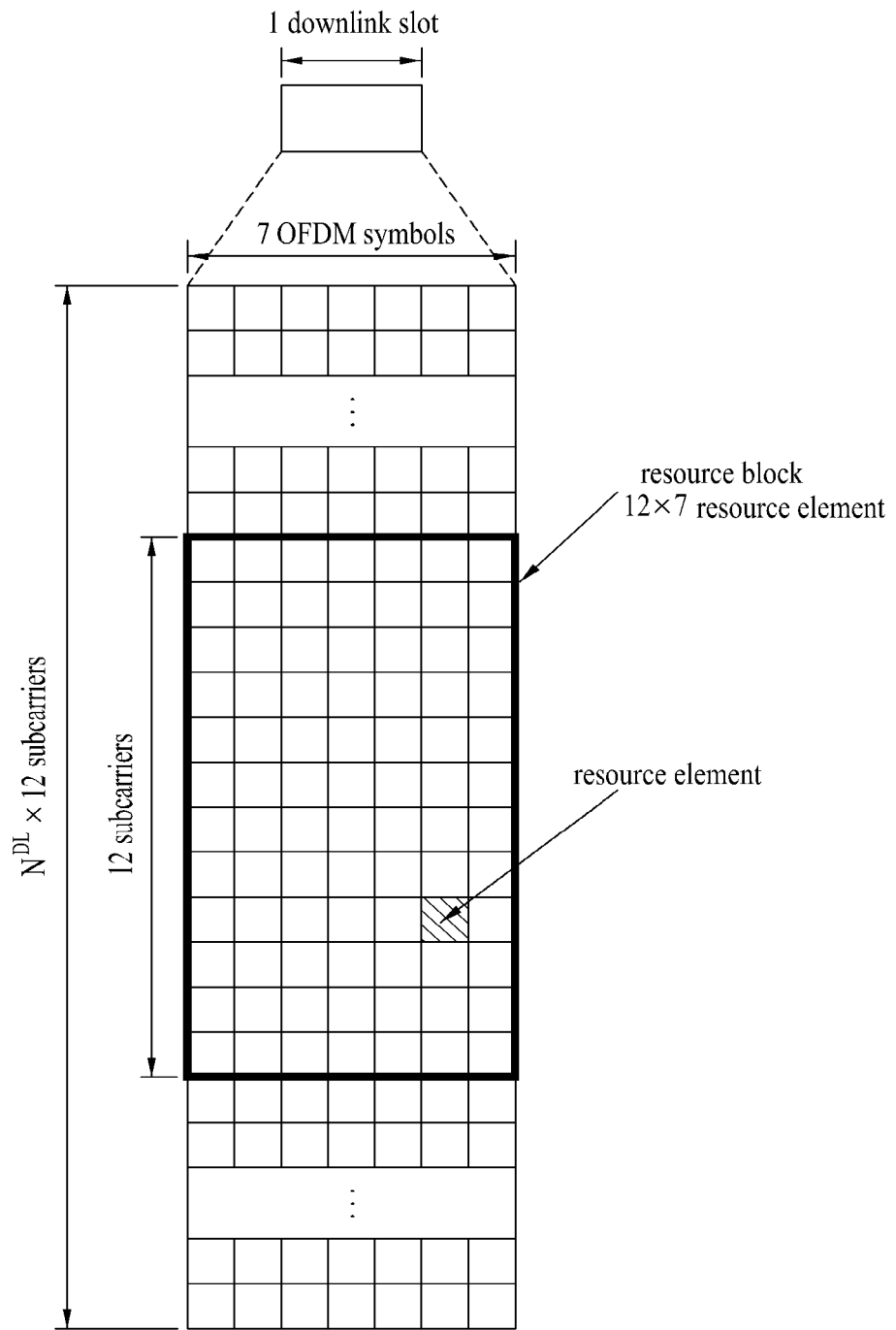
FIG. 2 illustrates a resource grid in a downlink slot.

FIG. 2 illustrates a resource grid in a downlink slot. Although one downlink slot includes 7 OFDM symbols in the time domain and one RB includes 12 subcarriers in the frequency domain in the example of FIG. 3, the present invention is not limited to this example. For example, one slot may include 6 OFDM symbols when extended CPs are applied while one slot includes 7 OFDM symbols when normal Cyclic Prefixes (CPs) are applied. Each element on the resource grid is referred to as a resource element (RE). One resource block (RB) includes 12×7 resource elements. The number of RBs (NDL) included in one downlink slot is determined based on a downlink transmission bandwidth. The structure of the uplink slot may be identical to the structure of the downlink slot.

Figure 3:
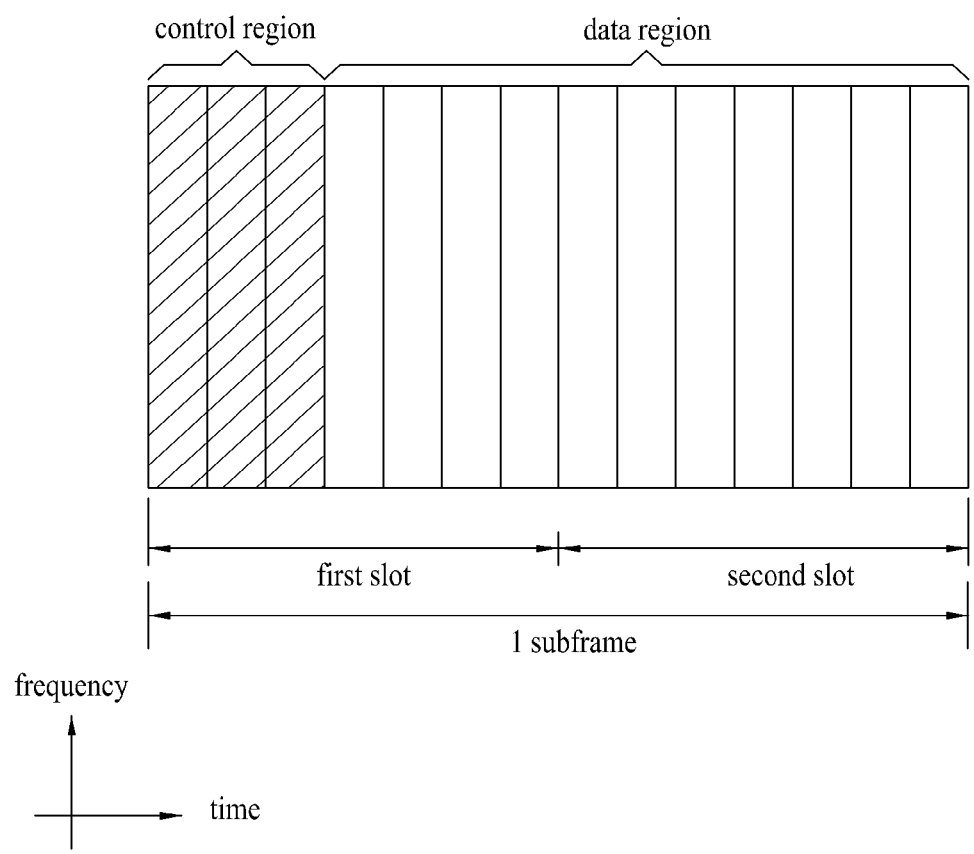
FIG. 3 illustrates the structure of a downlink subframe.

FIG. 3 illustrates the structure of a downlink subframe. Up to the first 3 OFDM symbols of a first slot within one subframe correspond to a control region to which a control channel is allocated. The remaining OFDM symbols correspond to a data region to which a Physical Downlink Shared Channel (PDSCH) is allocated. Downlink control channels used in the 3GPP LTE system include, for example, a Physical Control Format Indicator Channel (PCFICH), a Physical Downlink Control Channel (PDCCH), and a Physical Hybrid Automatic Repeat reQuest (HARQ) Indicator Channel (PHICH). The PCFICH is transmitted in the first OFDM symbol of a subframe and includes information regarding the number of OFDM symbols used to transmit a control channel in the subframe. The PHICH includes a HARQ ACK/NACK signal as a response to uplink transmission. Control information transmitted through the PDCCH is referred to as Downlink Control Information (DCI). The DCI includes uplink or downlink scheduling information or includes an uplink transmission power control command for a UE group. The PDCCH may include a resource allocation and transmission format of a Downlink Shared Channel (DL-SCH), resource allocation information of an Uplink Shared Channel (UL-SCH), paging information of a Paging Channel (PCH), system information of the DL-SCH, information regarding resource allocation of a higher layer control message such as a Random Access Response (RAR) that is transmitted in the PDSCH, a set of transmission power control commands for individual UEs in a UE group, transmission power control information, and information regarding activation of Voice over IP (VoIP). A plurality of PDCCHs may be transmitted within the control region. The UE may monitor the plurality of PDCCHs. The PDCCHs are transmitted in an aggregation of one or more consecutive Control Channel Elements (CCEs). Each CCE is a logical allocation unit that is used to provide the PDCCHs at a coding rate based on the state of a radio channel. The CCE corresponds to a plurality of resource element groups. The format of the PDCCH and the number of available bits are determined based on a correlation between the number of CCEs and a coding rate provided by the CCEs. The base station (eNB) determines the PDCCH format according to a DCI that is transmitted to the UE, and adds a Cyclic Redundancy Check (CRC) to control information. The CRC is masked with a Radio Network Temporary Identifier (RNTI) according to the owner or usage of the PDCCH. If the PDCCH is associated with a specific UE, the CRC may be masked with a cell-RNTI (C-RNTI) of the UE. If the PDCCH is associated with a paging message, the CRC may be masked with a paging indicator identifier (P-RNTI). If the PDCCH is associated with system information (more specifically, a system information block (SIB)), the CRC may be masked with a system information identifier and a system information RNTI (SI-RNTI). To indicate a random access response that is a response to transmission of a random access preamble from the UE, the CRC may be masked with a random access-RNTI (RA-RNTI).

Figure 4:
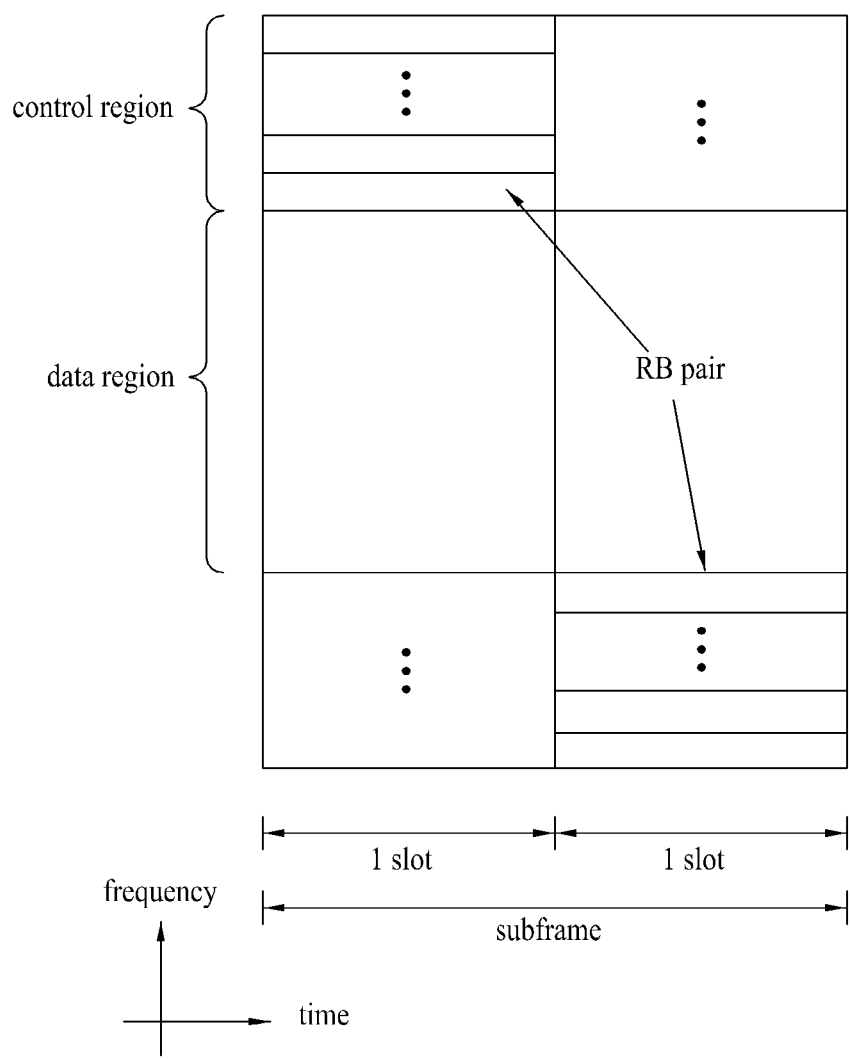
FIG. 4 illustrates the structure of an uplink subframe.

FIG. 4 illustrates the structure of an uplink subframe. The uplink subframe may be divided into a control region and a data region in the frequency domain. A Physical Uplink Control Channel (PUCCH) including uplink control information is allocated to the control region. A Physical Uplink Shared Channel (PUSCH) including user data is allocated to the data region. In order to maintain single carrier properties, one UE does not simultaneously transmit the PUCCH and the PUSCH. A PUCCH associated with one UE is allocated to an RB pair in a subframe. RBs belonging to the RB pair occupy different subcarriers in two slots. That is, the RB pair allocated to the PUCCH is "frequency-hopped" at a slot boundary.

Multi-Antenna System

Multi-antenna technology (i.e., MIMO technology) is an application of technology which does not depend on a single antenna path to receive a message but instead combines data fragments received through multiple antennas to reconstruct the message. The multi-antenna technology is considered a next-generation mobile communication technology which can be widely used for a mobile communication terminal, a relay, and the like since the technology can improve data transmission rate in a specific range or can increase a system range for a specific data transmission rate. The multi-antenna technology has also attracted attention as a next-generation technology which can overcome the limitation of the transmission capacity of mobile communication that has reached the limit due to extension of data communication.

The multi-antenna technology can be divided into a spatial multiplexing scheme and a spatial diversity scheme depending on whether or not the same data is transmitted. The spatial multiplexing scheme is a method of simultaneously transmitting different data through multiple transmit and receive antennas. That is, in the spatial multiplexing scheme, the transmitting side transmits different data through each transmit antenna and the receiving side identifies transmission data through appropriate interference removal and signal processing to improve transmission rate in proportion to the number of transmit antennas. The spatial diversity scheme is a method of achieving transmit diversity by transmitting the same data through multiple transmit antennas. That is, the spatial diversity scheme is a type of space-time channel coding scheme. The spatial diversity scheme can maximize transmit diversity gain (performance gain) by transmitting the same data through multiple transmit antennas. The spatial diversity scheme is a technology for increasing reliability of transmission using diversity gain rather than a method for improving transmission rate. Such two schemes may be appropriately combined to achieve the advantages of the two schemes as appropriate. The multi-antenna system may be classified into an open loop scheme (or a channel independent scheme) and a closed loop scheme (or a channel dependent scheme) according to whether or not the receiving side feeds channel information back to the transmitting side.

Figure 5:
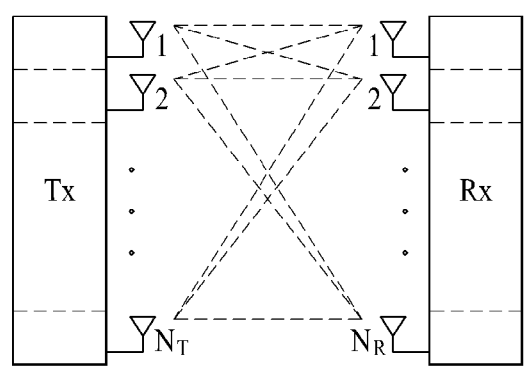
FIG. 5 illustrates a configuration of a general multi-antenna (MIMO) communication system.
Figure 5:
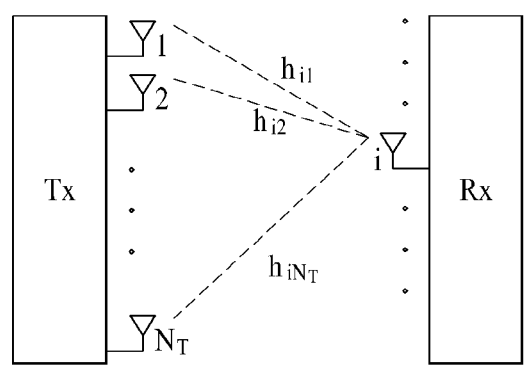

FIG. 5 illustrates a configuration of a general multi-antenna (MIMO) communication system. As shown in FIG. 5(a), if the number of transmit antennas is increased to $N_T$ and the number of receive antennas is increased to $N_R$, a channel transmission capacity is theoretically increased in proportion to the number of antennas unlike when a plurality of antennas is used only in a transmitter or a receiver. Accordingly, it is possible to improve transmission rate and to remarkably improve frequency efficiency. As the channel transmission capacity is increased, the transmission rate may be theoretically increased by the product of the maximum transmission rate $R_0$ when a single antenna is used and a rate increase ratio $R_1$ expressed in the following Expression 1

$$R_i = \min(N_T, N_R) \quad \text{Expression 1}$$

For example, in a MIMO system using four transmit antennas and four receive antennas, it is possible to theoretically acquire a transmission rate which is four times that of a single antenna system.

For a more detailed description of a communication method in a MIMO system, the communication method may be mathematically modeled as follows. As shown in FIG. 5(a), let us assume that $N_T$ transmit antennas and $N_R$ receive antennas are present. The maximum number of pieces of information that can be transmitted through transmission signals is $N_T$ when $N_T$ transmit antennas are present. Therefore, the transmitted information may be represented by a vector as shown in the following Expression 2.

$$s = [s_1, s_2, \ldots, s_{N_T}]^T \quad \text{Expression 2}$$

The transmitted information $s_1, s_2, \ldots, s_{N_T}$ may have different transmission powers. When $P_1, P_2, \ldots, P_{N_T}$ are the transmission powers, the transmitted information with adjusted powers may be represented by a vector as follows.

$$\hat{s} = [\hat{s}_1, \hat{s}_2, \ldots, \hat{s}_{N_T}]^T = [Ps_1, Ps_2, \ldots, Ps_{N_T}]^T \quad \text{Expression 3}$$

In addition, $\hat{s}$ may be expressed using a diagonal matrix P of the transmission powers as shown in the following Expression 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Expression 4}$$

Let us consider that the $N_T$ actually transmitted signals $x_1, x_2, \ldots, x_{N_T}$ are configured by applying a weight matrix W to the information vector $\hat{S}$ with the adjusted transmission powers. Here, the weight matrix W serves to appropriately distribute the transmitted information to each antenna according to the state of a transport channel or the like. $x_1, x_2, \ldots, x_{N_T}$ may be represented using the vector X as shown in the following Expression 5. Here, $W_1$ denotes a weight between an ith transmit antenna and jth information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & \ddots & \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Expression 5}$$

If $N_R$ receive antennas are present, respective received signals $y_1, y_2, \ldots, y_{N_R}$ of the antennas may be represented by a vector as shown in the following Expression 6.

$$y = [y_1, y_2, \ldots, y_{N_R}]^T \quad \text{Expression 6}$$

If channels are modeled in the MIMO communication system, the channels may be distinguished according to transmit and receive antenna indexes. Let $h_{ij}$ represent a channel from the transmit antenna j to the receive antenna i. Here, note that the indexes of the receive antennas precede the indexes of the transmit antennas in $h_{ij}$.

Such channels may be represented in combination by a vector or matrix. The following is an example of vector representation. FIG. 5(b) illustrates channels from $N_T$ transmit antennas to the receive antenna i.

As shown in FIG. 5(b), the channels from the $N_T$ transmit antennas to the receive antenna i may be expressed as follows.

$$h_i^T = [h_{i1}, h_{i2}, \ldots, h_{iN_T}] \quad \text{Expression 7}$$

When each of the channels from the $N_T$ transmit antennas to the $N_R$ receive antennas is represented by a matrix as shown in Expression 7, all channels from the $N_T$ transmit antennas to the $N_R$ receive antennas may be expressed as in the following Expression 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & \ddots & \\ h_{N_R1} & h_{N_R2} & \ldots & h_{N_RN_T} \end{bmatrix} \quad \text{Expression 8}$$

An Additive White Gaussian Noise (AWGN) is added to actual channels after the channels undergo such a channel matrix H. The AWGN $n_1, n_2, \ldots, n_{N_R}$ added to the $N_T$ transmit antennas may be expressed as shown in the following Expression 9.

$$n = [n_1, n_2, \ldots, n_{N_R}] \quad \text{Expression 9}$$

The received signals obtained using the above Expressions may be expressed as shown in the following Expression 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \vdots \\ h_{i2} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Expression 10

The numbers of rows and columns of the channel matrix H which indicates the channel state is determined by the numbers of transmit and receive antennas. The number of rows of the channel matrix H is equal to the number $N_R$ of receive antennas and the number of columns thereof is equal to the number $N_T$ of transmit antennas. That is, the channel matrix H may be represented by an $N_R \times N_T$ matrix. Generally, the rank of a matrix is defined as the smaller of the number of independent rows and the number of independent columns. Accordingly, the rank of a matrix cannot be greater than the number of rows or columns of the matrix. The rank of the channel matrix H may be expressed as shown in the following Expression 11.

$$\text{rank}(H) \leq \min(N_T, N_R) \qquad \text{Expression 11}$$

Uplink Transmission Structure

Figure 6:
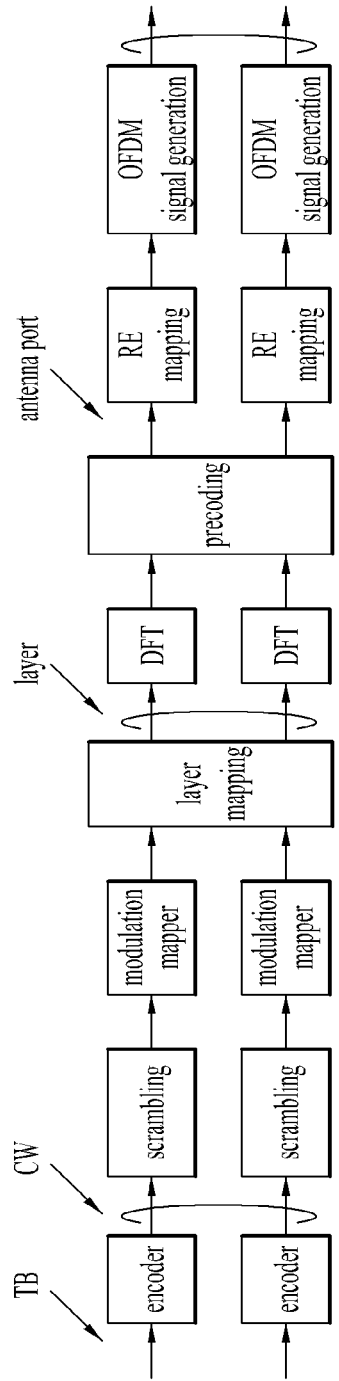
FIG. 6 is a block diagram illustrating an uplink transmission structure.

FIG. 6 is a block diagram illustrating an uplink transmission structure.

An encoding unit of information bits may be referred to as a transport block (TB). In FIG. 6, a unit input to an encoder corresponds to a TB and an output of the encoder corresponds to a codeword (CW). One or more codewords may be scrambled using a UE-specific scrambling signal.

Each of the scrambled codewords is modulated into a complex symbol using a BPSK, QPSK, 16 QAM, or 64 QAM scheme according to the type of the transmission signal and/or the condition of the channel. Thereafter, the modulated complex symbol is mapped to one or more layers.

The TB-to-CW mapping relationship may be defined as follows. For example, let us assume that 2 transport blocks are represented by TB1 and TB2 and 2 codewords are represented by CW0 and CW1 (or CW1 and CW2). When both transport blocks TB1 and TB2 are enabled, the first transport block TB1 may be mapped to the first codeword CW0 and the second transport block TB2 may be mapped to the second codeword CW1. When TB-to-CW swapping is applied, the first transport block TB1 may be mapped to the second codeword CW1 and the second transport block TB2 may be mapped to the first codeword CW0. When one of the transport blocks TB1 and TB2 is disabled and the other is enabled, the enabled transport block may be mapped to the first codeword CW0. That is, there is a TB-to-CW mapping relationship in which one transport block is mapped to one codeword. The cases in which a transport block is disabled include the case in which the size of the transport block is 0. When the size of a transport block is 0, the transport block is not mapped to a codeword.

The CW-to-layer mapping relationship may be as shown in the following Tables 1 and 2 according to the transmission scheme.

TABLE 1

| Number of layers | Number of code words | Codeword-to-layer mapping $i = 0, j, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |

TABLE 2

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 4 | 1 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ | $M_{symb}^{layer} = \begin{cases} \dfrac{M_{symb}^{(0)}}{4} & \text{if } M_{symb}^{(0)} \bmod 4 = 0 \\ \dfrac{(M_{symb}^{(0)} + 2)}{4} & \text{if } M_{symb}^{(0)} \bmod 4 \neq 0 \end{cases}$ If $M_{symb}^{(0)} \bmod 4 \neq 0$ two null symbols shall be appended to $d^{(0)}(M_{symb}^{(0)} - 1)$ |

Table 1 is an example when a signal is transmitted using the spatial multiplexing scheme and Table 2 is an example when a signal is transmitted using the transmit diversity scheme. In Tables 1 and 2, $x^{(a)}(i)$ represents an ith symbol and $d^{(a)}(i)$ represents an ith symbol of a codeword having index a. The "Number of layers" and "Number of codewords" items in Tables 1 and 2 show the mapping relationship between the number of layers and the number of codewords used for transmission and the "Codeword-to-Layer mapping" items show how symbols of each codeword are mapped to layers.

Although one codeword may be transmitted by being mapped to one layer on a symbol by symbol basis as can be seen from Tables 1 and 2, one codeword may also be mapped to up to 4 layers in a distributed manner as in the second case of Table 2. From Table 2, it can be seen that, when one codeword is distributed and mapped to a plurality of layers in this manner, symbols of each codeword are transmitted by being sequentially mapped to the layers. On the other hand, in the case of a single-codeword based transmission configuration, a single encoder and a single modulation block are present.

Such a layer-mapped signal may be transform-precoded. Specifically, Discrete Fourier Transform (DFT) precoding may be performed on the layer-mapped signal. The DFT-precoded signal may be multiplied by a precoding matrix selected according to the condition of the channel and may then be allocated to each transmit antenna. Such a processed transmission signal of each antenna may be mapped to a time-frequency resource element, which is to be used for transmission, and may then be transmitted through the antenna via an OFDM signal generator.

Uplink Scheduling Information

Control information for scheduling of uplink data transmission may be provided in the form of a downlink control information (DCI) format through a PDCCH. That is, an uplink transmitting end can acquire control information regarding uplink transmission through a format for uplink transmission (for example, DCI format 0 or 4) among DCI formats included in a PDCCH. Control information for uplink transmission may include control information for supporting multiple transport blocks (TBs). For example, the control information for uplink transmission may include a Modulation and Coding Scheme (MCS), a Redundancy Version (RV), and a New Data Indicator (NDI) and may also include a precoder index. Through a MCS, an RV, an NDV, a precoder index, or the like, it is possible to indicate whether a specific TB is enabled or disabled. The control information for uplink transmission may also include a swap flag for changing the TB-to-CW mapping. For example, when the basic setting is such that a first TB is mapped to a first CW and a second TB is mapped to a second CW, enabling a swap flag may set the first TB to be mapped to the second CW and set the second TB to be mapped to the first CW. In such a situation in which it is possible to acquire a PDCCH, information regarding an enabled TB, precoding information, TB-to-CW mapping, and the like may be determined through DCI format information.

Control Information Transmission in PUSCH

Figure 7:
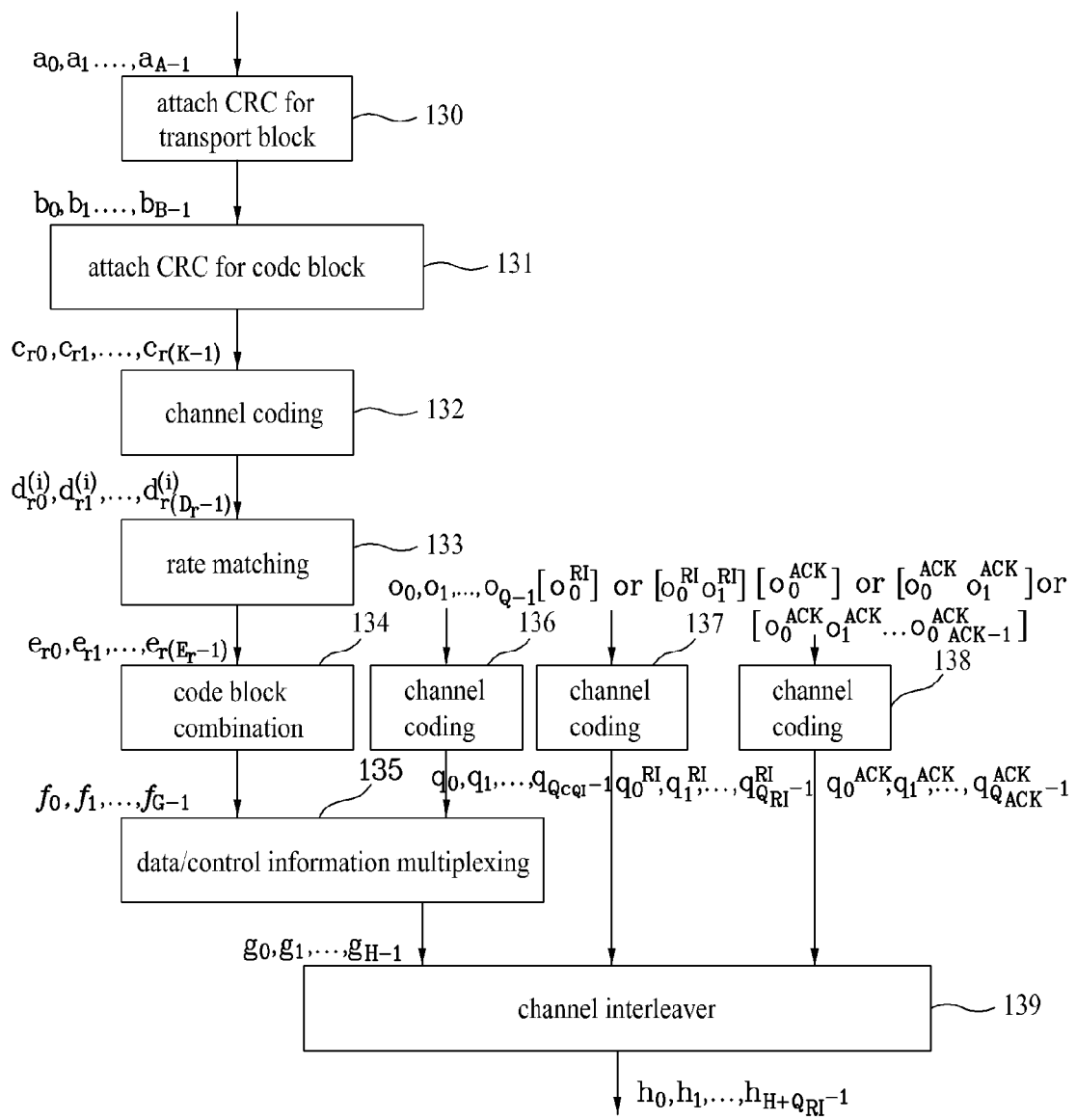
FIG. 7 is a block diagram illustrating a procedure for processing a transport channel for an uplink shared channel (PUSCH).

FIG. 7 is a block diagram illustrating a procedure for processing a transport channel for an uplink shared channel (PUSCH). As shown in FIG. 7, to transmit data that is to be multiplexed with control information, first, a Cyclic Redundancy Check (CRC) for Transport Block (TB) is attached to a TB for uplink transmission (130) and then the TB is divided into a plurality of Code Blocks (CBs) according to the size of the TB and a CRC for CB is attached to the CBs (131). Channel coding is performed on the resulting value (132). Channel-coded data items are then rate-matched (133), the CBs are combined (134), and the combined CBs are multiplexed with Channel Quality Information/Precoding Matrix Index (CQI/PMI) (135). In the description of the present invention, the CQI and the PMI may also be collectively referred to as CQI.

The CQI/PMI is channel-coded separately from the data (136). The channel-coded CQI/PMI is multiplexed with the data (135). A Rank Indication (RI) is also channel-coded separately from the data (137). Acknowledgement/Negative Acknowledgement (ACK/NACK) is channel-coded separately from the data, the CQI/PMI, and the RI (138). The multiplexed data and CQI/PMI and the separately channel-coded RI and ACK/NACK are channel-interleaved to generate an output signal (139).

Figure 8:
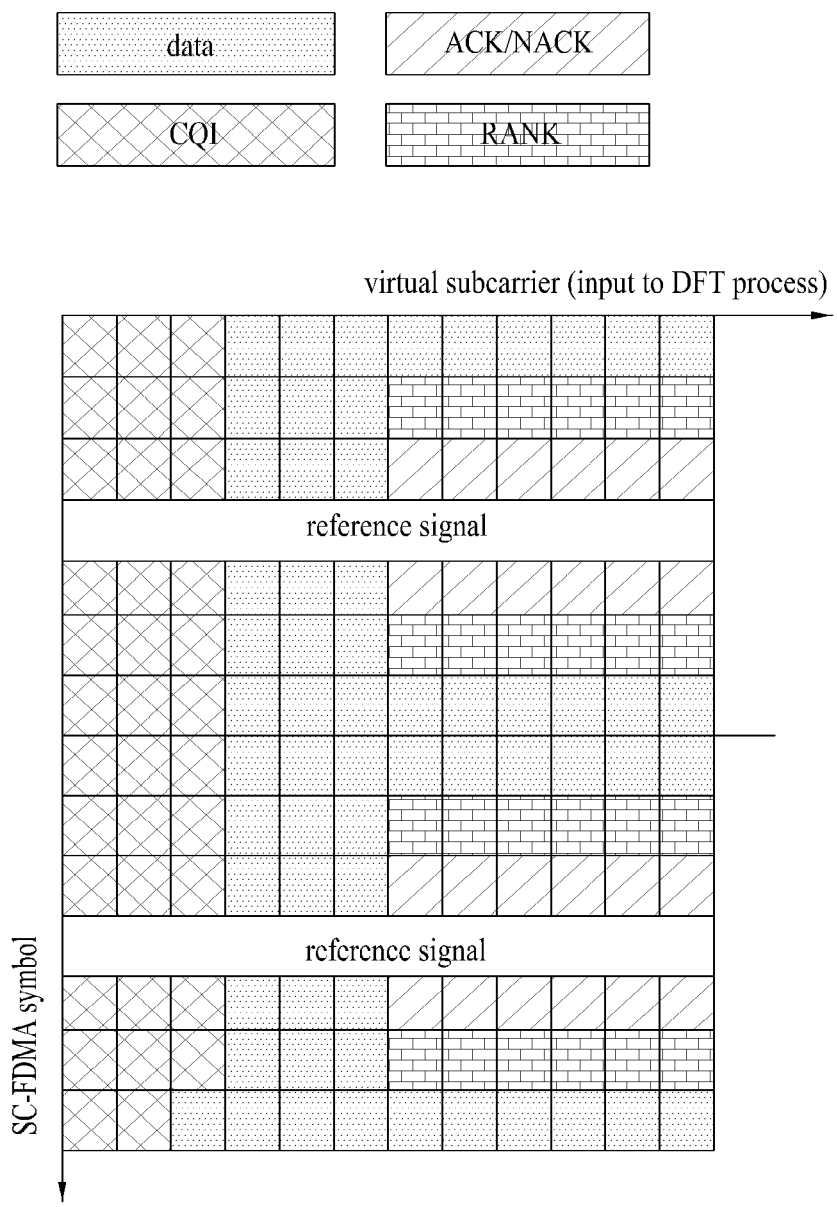
FIG. 8 illustrates a method for mapping physical resources for transmitting uplink data and Uplink Control Information (UCI).

FIG. 8 illustrates a method for mapping physical resources for transmitting uplink data and Uplink Control Information (UCI).

As shown in FIG. 8, CQI/PMI and data are mapped to REs in a time-first manner. An encoded ACK/NACK is inserted adjacent to Demodulation Reference Signal (DM RS) symbols through puncturing and an RI is mapped to REs next to REs at which the ACK/NACK is located. Resources for the RI and the ACK/NACK may occupy up to 4 SC-FDMA symbols. When data and control information are simultaneously transmitted in an uplink shared channel, mapping is performed in the order of RI->CQI/PMI and data concatenation->ACK/NACK. That is, after the RI is first mapped, the CQI/PMI and data concatenation is mapped in a time-first manner to REs other than REs to which the RI has been mapped. Mapping of the ACK/NACK is performed while puncturing the CQI/PMI and data concatenation which has already been mapped.

By multiplexing uplink control information such as data and CQI/PMI in the above manner, it is possible to satisfy single carrier characteristics. Thus, it is possible to accomplish uplink transmission which maintains a low Cubic Metric (CM).

The following is a description of a method for multiplexing data and UCI in an uplink shared channel.

A user equipment may identify the rank of data of a physical uplink shared channel (PUSCH) and set the rank of uplink control information (such as CQI, ACK/NACK, and RI) to the same as the rank of the uplink data. The user equipment may multiplex data and control information and map the data and CQI in a time-first manner and then may map the RI to designated REs. The user equipment may then perform channel interleaving to facilitate mapping of the ACK/NACK to REs adjacent to the DM-RS through puncturing of the REs. Thereafter, the user equipment may modulate the data and control channel using QPSK, 16QAM, 64QAM, or the like according to a Modulation and Coding Scheme (MCS) table.

The following is a description of a method for calculating the number of REs for UCI in a PUSCH. First, the numbers of REs for CQI and ACK/NACK (or RI) transmitted in a PUSCH may be calculated according to the following Expressions 12 and 13.

Expression 12

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{Ri}}{Q_m}\right)$$

Expression 13

$$Q' = \min\left(\left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(x)}-1} K_r^{(1)} \cdot M_{sc}^{PUSCH-initial(2)} \cdot N_{symb}^{PUSCH-initial(2)} + \sum_{r=0}^{C^{(x)}-1} K_r^{(2)} \cdot M_{sc}^{PUSCH-initial(1)} \cdot N_{symb}^{PUSCH-initial(1)}} \right\rceil, 4 \cdot M_{sc}^{PUSCH}\right)$$

Here, the numbers of REs for CQI and ACK/NACK (or RI) may each be represented by the number of coded modulation symbols.

The following is a description of a method for performing channel coding on UCI that is transmitted in a PUSCH. First, when the payload size of a CQI is equal to or less than 11 bits, a Reed-Muller (RM) using the following Table 3 is applied to an input sequence (i.e., information data) $o_0, o_1, o_2, \ldots, o_{O-1}$ to generate a 32-bit output sequence. In addition, when the payload size of the CQI is greater than bits, tail biting convolutional coding (TBCC) may be applied to the input sequence after an 8-bit CRC is attached to the same.

The following is a description a method for performing channel coding on an ACK/NACK and an RI that are transmitted in a PUSCH. When the data size of the ACK/NACK and the RI is 1 bit, i.e., when the input sequence is $[o_0^{UCI}]$, channel coding is performed on the ACK/NACK and the RI according to a modulation order Qm as shown in the following Table 4. When the data size of the ACK/NACK and the RI is 2 bits, i.e., when the input sequence is $[o_0^{UCI} o_1^{UCI}]$, channel coding is performed on the ACK/NACK and the RI according to the modulation order as shown in the following Table 5. In Table 5, $o_0^{UCI}$ corresponds to ACK/NACK or RI data for codeword 0, $o_1^{UCI}$ corresponds to ACK/NACK or RI data for codeword 1, and $o_2^{UCI}$ is $(o_0^{UCI} o_1^{UCI}) \bmod 2$. In Tables 4 and 5, x denotes a value of 1 and y denotes a replication of a previous value.

However, if the data size of the ACK/NACK and the RI is equal to or greater than 3 bits and equal to or less than 11 bits, Reed-Muller (RM) coding using the following Table 3 is applied to the input sequence to generate a 32-bit output sequence.

TABLE 4

| $Q_m$ | Encoded HARQ-ACK/RI |
|---|---|
| 2 | $[o_0^{UCI}\ y]$ |
| 4 | $[o_0^{UCI}\ y\ x\ x]$ |
| 6 | $[o_0^{UCI}\ y\ x\ x\ x\ x]$ |

TABLE 5

| $Q_m$ | Encoded HARQ-ACK/RI |
|---|---|
| 2 | $[o_0^{UCI}\ o_1^{UCI}\ o_2^{UCI}\ o_0^{UCI}\ o_1^{UCI}\ o_2^{UCI}]$ |
| 4 | $[o_0^{UCI}\ o_1^{UCI}\ x\ x\ o_2^{UCI}\ o_0^{UCI}\ x\ x\ o_1^{UCI}\ o_2^{UCI}\ x\ x]$ |
| 6 | $[o_0^{UCI}\ o_1^{UCI}\ x\ x\ x\ x\ o_2^{UCI}\ o_0^{UCI}\ x\ x\ x\ x\ o_1^{UCI}\ o_2^{UCI}\ x\ x\ x\ x]$ |

When RM coding using Table 3 is applied, output data $b_0, b_1, b_2, b_3, \ldots, b_{B-1}$ is expressed as shown in the following Expression 14 and B=32.

$$b_i = \sum_{n=0}^{O-1} (o_n \cdot M_{i,n}) \bmod 2 \qquad \text{Expression 14}$$

Finally, rate matching may be performed on the UCI (i.e., ACK/NACK or RI data), which has been coded into B bits, according to the following Expression 15 in order to map the UCI to Q' REs, the number (Q') of which has been calculated according to Expressions 12 and 13.

$$q_i = b_{i \bmod B}, i=0,1 \ldots, Q_m \times Q'-1 \qquad \text{Expression 15}$$

For more details of channel coding of control information in an uplink shared channel, refer to section 5.2.2.6 of the 3GPP TS 36.212 document. For more details of channel

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 1 | 1 | 1 |
| 22 | 1 | 0 | 0 | 0 | 1 | 0 | 0 | 1 | 1 | 0 | 1 |
| 23 | 1 | 1 | 0 | 1 | 0 | 0 | 0 | 1 | 1 | 1 | 1 |
| 24 | 1 | 1 | 1 | 1 | 0 | 1 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 | coding of CQI/PMI information in an uplink shared channel, refer to section 5.2.2.6.4 of the 3GPP TS 36.212 document. For more details of multiplexing of data and control information in an uplink shared channel, refer to section 5.2.2.7 of the 3GPP TS 36.212 document. In addition, for more details of the channel interleaver in an uplink shared channel, refer to section 5.2.2.8 of the 3GPP TS 36.212 document.

Method for Multiplexing UCI and UL Data in Transmission of Multiple TBs/Multiple CWs/Multiple Layers An LTE-A system which supports an extended antenna configuration as described above can support uplink transmission of up to 2 TBs (i.e., up to 2 CWs) through up to 4 transport layers. The following is a description of various embodiments of the present invention in which a TB, a CW, or a layer in which each of the uplink control information items (i.e., the CQI, the ACK/NACK, and the RI) is transmitted is defined when the uplink control information items are multiplexed and transmitted in uplink data (i.e., a PUSCH).

As described above with reference to FIG. 6 and Tables 1 and 2, in a system using multiple antennas, a TB is mapped to a CW and a CW is mapped to a transport layer. The following Table 6 shows TB-to-CW mapping CW-to-layer mapping when the number of enables TBs is 1 or 2.

TABLE 6

|  | TB | CW | Layer |
|---|---|---|---|
| A | 1st TB | 1st CW | 1st layer |
| B-1 | 1st TB | 1st CW | 1st layer |
|  | 2nd TB | 2nd CW | 2nd layer |
| B-2 | 1st TB | 2nd CW | 2nd layer |
|  | 2nd TB | 1st CW | 1st layer |
| C-1 | 1st TB | 1st CW | 1st layer |
|  | 2nd TB | 2nd CW | 2nd layer |
|  |  |  | 3rd layer |
| C-2 | 1st TB | 2nd CW | 2nd layer |
|  |  |  | 3rd layer |
|  | 2nd TB | 1st CW | 1st layer |
| D-1 | 1st TB | 1st CW | 1st layer |
|  |  |  | 2nd layer |
|  | 2nd TB | 2nd CW | 3rd layer |
|  |  |  | 제 4 layer |
| D-2 | 1st TB | 2nd CW | 3rd layer |
|  |  |  | 제 4 layer |
|  | 2nd TB | 1st CW | 1st layer |
|  |  |  | 2nd layer |
| E-1 | 1st TB | 1st CW | 1st layer |
|  |  |  | 2nd layer |
| E-2 | 1st TB | 2nd CW | 1st layer |
|  |  |  | 2nd layer |

Item A in Table 6 shows that, when the number of enabled TBs is 1 and the number of transport layers is 1, the 1st TB is mapped to the 1st CW and the 1st CW is mapped to the 1st layer.

Item B in Table 6 shows that, when the number of enabled TBs is 2 and the number of transport layers is 2, the 1st TB is mapped to the 1st CW and the 2nd TB is mapped to the 2nd CW (B-1) or the 1st TB is mapped to the 2nd CW and the 2nd TB is mapped to the 1st CW (B-2) and the 1st CW is mapped to the 1st layer and the 2nd CW is mapped to the 2nd layer.

Item C in Table 6 shows that, when the number of enabled TBs is 2 and the number of transport layers is 3, the 1st TB is mapped to the 1st CW and the 2nd TB is mapped to the 2nd CW (C-1) or the 1st TB is mapped to the 2nd CW and the 2nd TB is mapped to the 1st CW (C-2) and the 1st CW is mapped to the 1st layer and the 2nd CW is mapped to the 2nd and 3rd layers.

Item D in Table 6 shows that, when the number of enabled TBs is 2 and the number of transport layers is 4, the 1st TB is mapped to the 1st CW and the 2nd TB is mapped to the 2nd CW (D-1) or the 1st TB is mapped to the 2nd CW and the 2nd TB is mapped to the 1st CW (D-2) and the 1st CW is mapped to the 1st and 2nd layers and the 2nd CW is mapped to the 3rd and 4th layers.

Item E in Table 6 shows that, when the number of enabled TBs is 1 and the number of transport layers is 2, the 1st TB is mapped to the 1st CW (E-1) or the 1st TB is mapped to the 2nd CW (E-2 ), and the 1st CW is mapped to the 1st and 2nd layers.

As illustrated in Table 6, when data is transmitted through multiple layers, data and control information may be multiplexed and transmitted in a data channel (PUSCH). Such control information may include CQI, RI, and ACK/NACK information.

First, it is possible to consider that uplink control information (UCI) is multiplexed and transmitted with part of the multiple CWs (for example, one of the multiple CWs).

Here, although one CW may be mapped to one layer as shown in Table 6, one CW may also be mapped to a plurality of layers. When one CW is mapped to one layer, UCI may be multiplexed in a PUSCH in the same manner as in the conventional method. On the other hand, when one CW is mapped to multiple layers, UCI may be equally replicated and transmitted in each layer to which the CW is mapped. Replication and transmission of UCI in each of the layers indicates that each layer includes one complete UCI and the same UCI is present in each layer. Alternatively, when one CW is mapped to multiple layers, UCI may be spread and transmitted in each of the layers to which the CW is mapped. Spreading and transmission of UCI in a plurality of layers indicates that part of the UCI is present in one layer, another part of the UCI is present in another layer, and the parts are combined to construct one complete UCI.

Next, it is possible to consider that UCI is multiplexed and transmitted with all multiple CWs (for example, 2 CWs).

In this case, UCI may be equally replicated and transmitted in each of the multiple CWs. Alternatively, the UCI may be spread and transmitted in the multiple CWs. Also, in this case, as illustrated in Table 6, layers to which the multiple CWs are mapped are present and UCI may be replicated and transmitted in a layer to which one CW is mapped or may be spread and transmitted in the layer.

As described above, replicated/spread transmission of UCI on a CW basis and/or on a layer basis may be applied in various combinations according to the attribute of the UCI. For example, CQI information may be multiplexed and transmitted only with part of the CWs and RI and ACK/NACK information may be multiplexed and transmitted with all CWs. Here, the CQI information which is transmitted with part of the CWs may be replicated and transmitted in all layers to which the part of the CWs is mapped and the RI and ACK/NACK information which is transmitted with all CWs may be replicated and transmitted in all layers to which all CWs are mapped.

The following is a description of a method for selecting a CW with which UCI is to be multiplexed from multiple CWs when the UCI is multiplexed with part of the multiple CWs. In the following description, a CW which is multiplexed with UCI is referred to as a CW which is mapped to UCI.

In the first method, to reduce complexity of selection of a CW to which UCI is mapped, it is possible to define mapping such that UCI is fixedly mapped to a CW of a specific number (or index) among multiple CWs. For example, when UCI is multiplexed and transmitted with uplink data, the UCI may always be mapped to the 1st CW.

In the second method, to increase the probability of success of reception of UCI by a receiving side, it is possible to define mapping such that a CW having a relatively high Signal-to-Interference plus Noise Ratio (SINR) is mapped to UCI. For example, a CW, which is assigned a high MCS level from among MCS levels of CWs (or TBs mapped to CWs) included in downlink control information (DCI) for providing scheduling of uplink data transmission, may be mapped to UCI.

In the third method, UCI may be mapped to a CW which is mapped to a large number of layers. For example, when 2 CWs are transmitted through 3 layers, one of the 2 CWs is mapped to 1 layer and the other CW is mapped to 2 layers. In this case, UCI may be multiplexed and transmitted with the CW which is mapped to the 2 layers.

In addition to the TB-to-CW mapping relationship and the CW-to-layer mapping relationship, each layer may be mapped to one or more antenna ports. Referring back to FIG. 6, each layer is input to the precoder after a CW is mapped to the layer and the precoder then maps each layer to an antenna port. That is, a unit that is input to the encoder is referred to as a TB, a unit that is input to the scrambling block and is then input to the mapping block is referred to as a CW, a unit that is input from the output of the layer mapping block to the precoding block is referred to as a layer, and the output of the precoding block is referred to as an antenna port.

The precoding scheme is a method of mapping a layer to an antenna port and the Peak-to-Average Power Ratio (PAPR) or Cubic Metric (CM) of a transmit antenna may be maintained or increased according to the attribute of the precoder that is applied to uplink multi-antenna transmission. It is preferable that, in uplink transmission, a low PAPR be maintained due to limited transmission power of the user equipment. Accordingly, there is a need to apply a structure capable of maintaining a low PAPR when the precoding scheme is applied. In this regard, it is possible to maintain a low PAPR when a precoder which maps one layer to each antenna port is used. For example, when 2 layers are transmitted through 2 antenna ports, the 1st layer may be set to be transmitted through the 1st antenna port and the 2nd layer may be set to be transmitted through the 2nd antenna port. In addition, when 2 layers are transmitted through 4 antenna ports, the 1st layer may be set to be transmitted through the 1st and 2nd antenna ports and the 2nd layer may be set to be transmitted through the 3rd and 4th antenna ports.

Taking into consideration this, it is possible to set a TB-CW-layer-antenna port mapping relationship as shown in the following Tables 7 and 8. Table 7 is associated with the case in which one TB is enabled and Table 8 is associated with the case in which 2 TBs are enabled. In the following description, the 1st TB and the 2nd TB may be represented respectively by indices, TB1 and TB2, the 1st CW and the 2nd CW may be represented respectively by indices, CW1 and CW2, the 1st to 4th layers may be represented respectively by indices, layers 0 to 3, and the 1st to 4th antenna ports may be represented respectively by indices, antenna ports 0 to 4.

TABLE 7

|     | TB     | CW     | Layer     | Antenna Port     |
| --- | ------ | ------ | --------- | ---------------- |
| A-1 | 1st TB | 1st CW | 1st layer | 1st antenna port |
|     |        |        |           | 2nd antenna port |
| A-2 | 2nd TB | 1st CW | 1st layer | 1st antenna port |
|     |        |        |           | 2nd antenna port |

TABLE 7-continued

|     | TB     | CW     | Layer     | Antenna Port     |
| --- | ------ | ------ | --------- | ---------------- |
| B-1 | 1st TB | 1st CW | 1st layer | 1st antenna port |
|     |        |        |           | 2nd antenna port |
|     |        |        |           | 3rd antenna port |
|     |        |        |           | 4th antenna port |
| B-2 | 2nd TB | 1st CW | 1st layer | 1st antenna port |
|     |        |        |           | 2nd antenna port |
|     |        |        |           | 3rd antenna port |
|     |        |        |           | 4th antenna port |
| C-1 | 1st TB | 1st CW | 1st layer | 1st antenna port |
|     |        |        |           | 2nd antenna port |
|     |        |        | 2nd layer | 3rd antenna port |
|     |        |        |           | 4th antenna port |
| C-2 | 2nd TB | 1st CW | 1st layer | 1st antenna port |
|     |        |        |           | 2nd antenna port |
|     |        |        | 2nd layer | 3rd antenna port |
|     |        |        |           | 4th antenna port |

A-1 and A-2 in Table 7 show that 1 TB is mapped to 1 CW and is mapped to 1 layer and is then transmitted through 2 antenna ports. Although the 1st TB may be set by default to be enabled when only one TB is enabled as in A-1, only the 2nd TB may also be enabled as needed as in A-2.

B-1 and B-2 in Table 7 show that 1 TB is mapped to 1 CW and is mapped to 1 layer and is then transmitted through 4 antenna ports.

C-1 and C-2 in Table 7 show that 1 TB is mapped to 1 CW and is mapped to 2 layers and is then transmitted through 4 antenna ports. In this case, 1 layer is mapped to 2 antenna ports.

When only one TB is enabled as in Table 7, UCI may be mapped to the enabled TB. Since the enabled TB is mapped to the 1st CW, mapping of the UCI to the enabled TB has the same effects as mapping of the UCI to the 1st CW. Here, when a plurality of layers is mapped to one enabled TB (i.e., CW), UCI may be replicated and transmitted in each layer or may be spread and transmitted in the layer as described above.

TABLE 8

|     | TB     | CW     | layer     | antenna port                 |
| --- | ------ | ------ | --------- | ---------------------------- |
| A-1 | 1st TB | 1st CW | 1st layer | 1st antenna port             |
|     | 2nd TB | 2nd CW | 2nd layer | 2nd antenna port             |
| A-2 | 2nd TB | 1st CW | 1st layer | 1st antenna port             |
|     | 1st TB | 2nd CW | 2nd layer | 2nd antenna port             |
| B-1 | 1st TB | 1st CW | 1st layer | 1st antenna port (0, 0, 0)   |
|     |        |        |           | 2nd antenna port (1, 3, 4)   |
|     | 2nd TB | 2nd CW | 2nd layer | 3rd antenna port (2, 1, 1)   |
|     |        |        |           | 4th antenna port (3, 3, 2)   |
| B-2 | 2nd TB | 1st CW | 1st layer | 1st antenna port (0, 0, 0)   |
|     |        |        |           | 2nd antenna port (1, 3, 4)   |
|     | 1st TB | 2nd CW | 2nd layer | 3rd antenna port (2, 1, 1)   |
|     |        |        |           | 4th antenna port (3, 3, 2)   |
| C-1 | 1st TB | 1st CW | 1st layer | 1st antenna port (0, 0, 0, 1, 1, 2) |
|     |        |        |           | 2nd antenna port (1, 2, 3, 2, 3, 3) |
|     | 2nd TB | 2nd CW | 2nd layer | 3rd antenna port (2, 1, 1, 0, 0, 0) |
|     |        |        | 3rd layer | 4th antenna port (3, 3, 2, 3, 2, 1) |
| C-2 | 2nd TB | 1st CW | 1st layer | 1st antenna port (0, 0, 0, 1, 1, 2) |
|     |        |        |           | 2nd antenna port (1, 2, 3, 2, 3, 3) |
|     | 1st TB | 2nd CW | 2nd layer | 3rd antenna port (2, 1, 1, 0, 0, 0) |
|     |        |        | 3rd layer | 4th antenna port (3, 3, 2, 3, 2, 1) |
| D-1 | 1st TB | 1st CW | 1st layer | 1st antenna port             |
|     |        |        | 2nd layer | 2nd antenna port             |
|     | 2nd TB | 2nd CW | 3rd layer | 3rd antenna port             |
|     |        |        | 4th layer | 4th antenna port             |
| D-2 | 2nd TB | 1st CW | 1st layer | 1st antenna port             |
|     |        |        | 2nd layer | 2nd antenna port             |
|     | 1st TB | 2nd CW | 3rd layer | 3rd antenna port             |
|     |        |        | 4th layer | 4th antenna port             |

A-1 and A-2 in Table 8 show that 2 enabled TBs are each mapped to 1 CW, 1 CW is mapped to 1 layer, and 1 layer is transmitted through 1 antenna port. In this case, 2-antenna-port transmission is performed. B-1 and B-2 in Table 8 show that 2 enabled TBs are each mapped to 1 CW, 1 CW is mapped to 1 layer, and 1 layer is transmitted through 2 antenna ports. In this case, 4-antenna-port transmission is performed.

C-1 and C-2 in Table 8 show that 2 enabled TBs are each mapped to 1 CW, one of the 2 CWs is mapped to 1 layer, the 1 layer is mapped to 2 app, the other CW is mapped to 2 layers, and the 2 layers are each mapped to 1 antenna port. In this case, 4-antenna-port transmission is performed.

D-1 and D-2 in Table 8 show that 2 enabled TBs are each mapped to 1 CW, 1 CW is mapped to 2 layers, the 2 layers are each mapped to 1 antenna port. In this case, 4-antenna-port transmission is performed.

In the cases of A-1, A-2, D-1, and D-2 of Table 8, the 1st CW is mapped to a specific antenna port. The 1st CW is mapped to the 1st antenna port in the case of 2-antenna-port transmission as in A-1 and A-2 and the 1st CW is mapped to the 1st and 2nd antenna ports in the case of 4-antenna-port transmission as in D-1 and D-2. The 2nd CW is also mapped to a specific antenna port. Here, the 2nd CW is mapped to the 2nd antenna port in the case of 2-antenna-port transmission (A-1 and A-2) and the 2nd CW is mapped to the 3rd and 4th antenna ports in the case of 4-antenna-port transmission (D-1 and D-2).

On the other hand, in the cases of B-1, B-2, C-1, and C-2 of Table 8, the 1st CW may be mapped to 2 of the 1st to 4th antenna ports. Here, the 2nd CW may be mapped to the other 2 antenna ports to which the 1st CW is not mapped.

In the case of MIMO transmission in which 2 TBs are enabled, a specific CW is mapped to a specific antenna port. Here, the reliability of transmission of the specific CW may vary according to the output power state of the physical antenna or the characteristics of the power amplifier of the physical antenna. To increase the probability of success of signal transmission, there is a need to select a CW, which is transmitted through an antenna port whose channel condition is relatively good, as a CW with which UCI is multiplexed.

The following is a description of a method for setting UCI to be multiplexed with a specific TB when one or more TBs are enabled.

First, when one TB is enabled, UCI may be set to be multiplexed with the enabled TB.

Next, when two TBs are enabled, UCI may be set to be multiplexed with one of the two TBs which is always fixed. The fixed TB may always be set to the 1st TB or may always be set to the 2nd TB. When a TB-to-CW swap flag is disabled, the 1st TB may be mapped to the 1st CW and the 2nd TB may be mapped to the 2nd CW. In this case, UCI may be set to be always mapped to the 1st CW. When the TB-to-CW swap flag is enabled, the 1st TB may be mapped to the 2nd CW and the 2nd TB may be mapped to the 1st CW. In this case, UCI may be set to be always mapped to the 2nd CW.

Selection of a TB with which UCI is multiplexed may be applied differently according to the characteristics of the UCI. For example, CQI may be mapped to a specific TB as described above while RI and ACK/NACK information may be set to be mapped to all CWs and all layers.

On the other hand, in some cases, uplink transmission may be performed even when uplink scheduling information has not been acquired through a PDCCH. For example, when Semi-Persistent Scheduling (SPS) is applied, data may be transmitted/retransmitted for a long time using control information included in a PDCCH which has been received at a specific time. When data is transmitted without a PDCCH in this manner, UCI may also be set to be multiplexed and transmitted with a predetermined specific TB in the same manner as described above.

In addition, it is possible to select a TB to which UCI is mapped according to the MCS level or the modulation order.

For example, UCI may be set to be multiplexed with a TB which is assigned a high MCS level through a PDCCH and may also be set to be multiplexed with a TB which is instructed to be assigned a low MCS level through a PDCCH.

Such a TB may also be selected according to the modulation order. For example, let us assume that the modulation order and the coding rate are changed to set an MCS level which enables transmission of the same size of TBs. In this case, when the channel quality is low, it may be possible to perform more robust transmission by applying an MCS level having a low modulation order. Accordingly, when an MCS level which indicates transmission of the same size of TBs has been set, UCI may be set to be multiplexed with a TB which is assigned an MCS level having a low modulation order among the TBs.

Alternatively, UCI may be set by default to be multiplexed with a TB for which a high MCS level has been set and UCI may be set to be multiplexed with a TB having a low MCS level (low modulation order) when the MCS level is a specific MCS level.

UCI may also be set to be mapped only to a TB having a specific modulation order for more robust transmission of the UCI. For example, UCI may be multiplexed and transmitted only with a TB which is set as QPSK.

Figure 9:
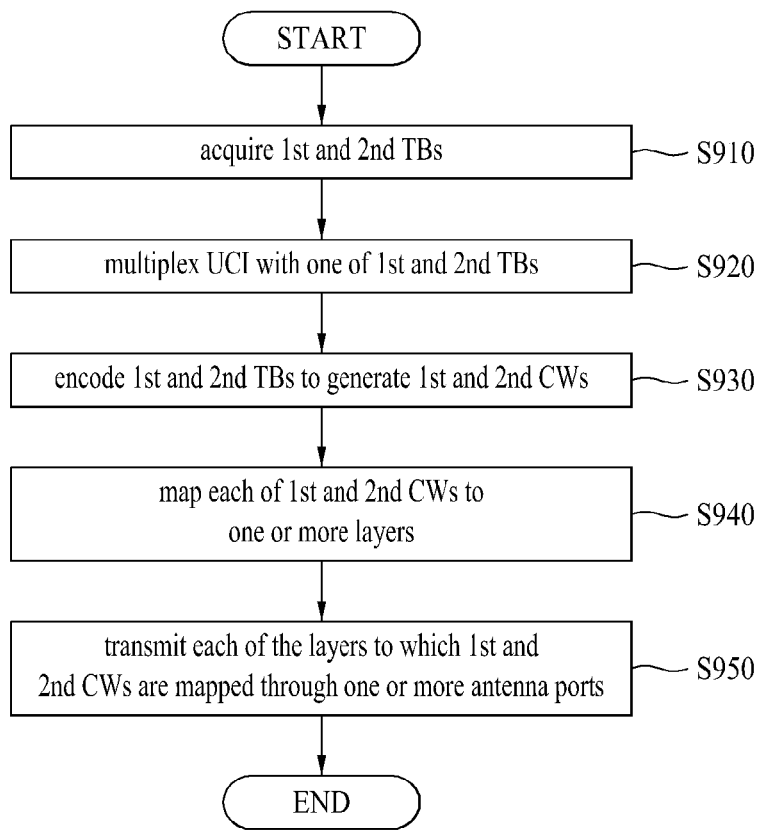
FIG. 9 is a flowchart illustrating a method for multiplexing and transmitting uplink control information and uplink data according to the present invention.

FIG. 9 is a flowchart illustrating a method for multiplexing and transmitting uplink control information and uplink data according to the present invention.

An uplink transmission entity (for example, a user equipment) may acquire 2 TBs (1st and 2nd TBs) in step S910 and may then multiplex the uplink control information (UCI) with only one of the 2 TBs in step S920. Here, the TB with which the UCI is multiplexed may be determined to be a TB which is assigned a relatively high MCS level or a TB which is assigned a relatively low MCS level. Alternatively, the TB with which the UCI is multiplexed may be determined to be a TB which has a relatively low modulation order. Such UCI may correspond to at least one of an RI, a CQI (CQI and/or PMI), and a HARQ ACK/NACK.

In step S930, 1st and 2nd TBs may be encoded to generate 1st and 2nd CWs and, in step S940, the 1st and 2nd CWs may each be mapped to one or more layers. In step S950, the layers to which the 1st and 2nd CWs are mapped may each be mapped to one or more antenna ports. In this manner, the UCI and the uplink data may be multiplexed and transmitted through one or more antenna ports.

Here, the TB-to-CW mapping relationship, the CW-to-layer mapping relationship, and the layer-to-antenna relationship may follow the examples of Tables 1, 2, 6 to 8 described above.

In addition, the TB with which the UCI is multiplexed may be mapped to one CW, this CW may be mapped to one or more layers, and the UCI may be replicated and transmitted or may be spread and transmitted in the one or more layers.

The features of the various embodiments of the present invention described above may each be independently applied to the method for multiplexing uplink control information and uplink data according to the present invention described above with reference to FIG. 9 or 2 or more of the embodiments may be simultaneously applied to the method and a description of the same details as described above is omitted herein for clarity.

In addition, although the uplink transmission entity is exemplified mainly by a base station and the uplink transmission entity is exemplified mainly by a user equipment (or terminal) in the above description of the various embodiments of the present invention, the scope of the present invention is not limited thereto. That is, the principles of the present invention described above through the various embodiments of the present invention may be equally applied to the case in which a relay serves as an entity for downlink transmission to a user equipment or serves as an entity for uplink reception from a user equipment or the case in which a relay serves as an entity for uplink transmission to a base station or serves as an entity for downlink reception from a base station.

Figure 10:
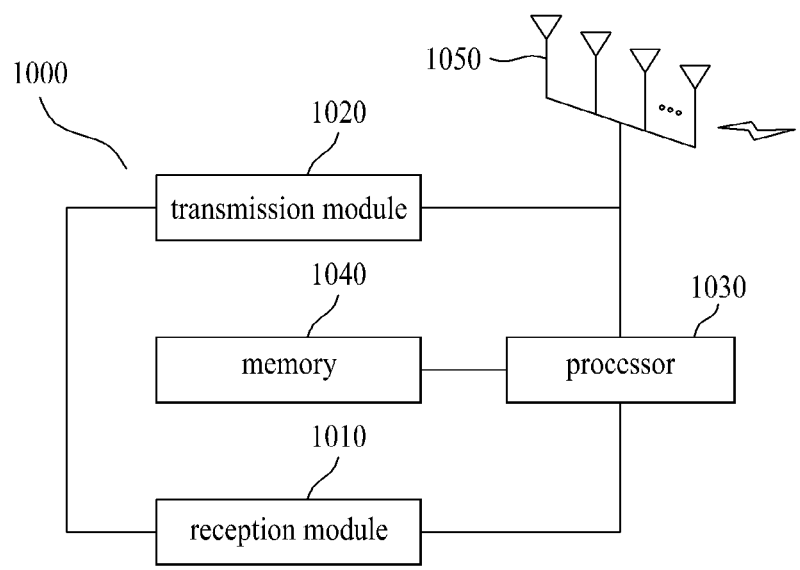
FIG. 10 illustrates a configuration of a transmission device according to the present invention.

FIG. 10 illustrates a configuration of a transmission device according to the present invention.

As shown in FIG. 10, a transmission device 1000 according to the present invention may include a reception module 1010, a transmission module 1020, a processor 1030, a memory 1040, and a plurality of antennas 1050. The plurality of antennas 1050 indicates that the transmission device 1050 supports MIMO transmission and reception. The reception module 1010 may receive various signals, data, and information. The transmission module 1020 may transmit various signals, data, and information. The processor 1030 may control overall operation of the transmission device 1000.

The transmission device 1000 according to an embodiment of the present invention may be configured to multiplex and transmit uplink control information with uplink data. The processor 1030 of the transmission device may be configured to encode 1st and 2nd transport blocks to generate 1st and 2nd codewords. The uplink control information may be multiplexed with only one of the 1st and 2nd transport blocks. The processor 1030 may be configured to map each of the 1st and 2nd codewords to one or more layers. The processor 1030 may be configured to allow the transmission module 1020 to transmit each of the layers to which the 1st and 2nd codewords are mapped through one or more antenna ports.

The processor 1030 of the transmission device 1000 may also function to arithmetically process information such as information received by the transmission device 1000 and information to be externally transmitted and the memory 1040 may store the arithmetically processed information or the like for a specific time and may be replaced with a component such as a buffer (not shown).

The features of the various embodiments of the present invention described above may each be independently applied to the detailed configuration of the transmission device 1000 described above or 2 or more of the embodiments may be simultaneously applied to the detailed configuration of the transmission device 1000 and a description of the same details as described above is omitted herein for clarity.

In addition, the transmission device 1000 may be a user equipment that receives a downlink signal from a base station and transmits an uplink signal to the base station. The description of the transmission device 1000 may be equally applied to a relay which serves as a downlink reception entity or an uplink transmission entity.

The embodiments of the present invention described above may be implemented by various means. For example, the embodiments of the present invention may be implemented by hardware, firmware, software, or any combination thereof.

In the case in which the present invention is implemented by hardware, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may combine the structures described in the above embodiments in a variety of ways. Accordingly, the invention should not be limited to the specific embodiments described herein, but should be accorded the broadest scope consistent with the principles and novel features disclosed herein.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention. The invention should not be limited to the specific embodiments described herein, but should be accorded the broadest scope consistent with the principles and novel features disclosed herein. In addition, it will be apparent that claims which are not explicitly dependent on each other can be combined to provide an embodiment or new claims can be added through amendment after this application is filed.

INDUSTRIAL APPLICABILITY

The embodiments of the present invention described above may be applied to various mobile communication systems.

The invention claimed is:

1. A method of transmitting uplink data by a user equipment in a wireless communication system, the method comprising:
coding uplink control information (UCI) and a plurality of transport blocks (TBs) each containing the uplink data to generate a plurality of codewords (CWs), wherein channel quality information (CQI) of the UCI is multiplexed with the uplink data of only one TB from among the plurality of TBs and a rank indicator (RI) of the UCI is multiplexed in all the TBs; and transmitting the plurality of codewords (CWs) through a plurality of layers.

2. The method of claim 1, wherein the RI is received through all the layers.

3. The method of claim 1, wherein a number of the CWs is equal to a number of the TBs and is equal to or smaller than a number of the layers.

4. A non-transitory computer readable medium comprising a program for performing the method of claim 1 recorded thereon.

5. The method of claim 1, wherein the only one TB for multiplexing the CQI with the uplink data is selected based on modulation and coding scheme (MCS) values of the TBs.

6. The method of claim 5, wherein the only one TB selected for multiplexing the CQI with the uplink data has a highest MCS value among the MCS values, if the MCS values are different from each other.

7. The method of claim 5, wherein the only one TB selected for multiplexing the CQI with the uplink data is a predetermined TB among the TBs, if the MCS values are identical to each other.

8. The method of claim 5, wherein the MCS values are received via a physical downlink control channel (PDCCH) having an uplink grant.

9. A user equipment comprising:

a processor that codes uplink control information (UCI) and a plurality of transport blocks (TBs) each containing the uplink data to generate a plurality of codewords (CWs), wherein channel quality information (CQI) of the UCI is multiplexed with the uplink data of only one TB from among the plurality of TBs and a rank indicator (RI) of the UCI is multiplexed in all the TBs; and a transmitter that transmits the plurality of codewords (CWs) through a plurality of layers.

10. The user equipment of claim 9, wherein the RI is received through all the layers.

11. The user equipment of claim 9, wherein a number of the CWs is equal to a number of the TBs and is equal to or smaller than a number of the layers.

12. The user equipment of claim 9, wherein the only one TB for multiplexing the CQI with the uplink data is selected based on modulation and coding scheme (MCS) values of the TBs.

13. The user equipment of claim 12, wherein the only one TB selected for multiplexing the CQI with the uplink data has a highest MCS value among the MCS values, if the MCS values are different from each other.

14. The user equipment of claim 12, wherein the only one TB selected for multiplexing the CQI with the uplink data is a predetermined TB among the TBs, if the MCS values are identical to each other.

15. The user equipment of claim 12, wherein the MCS values are received via a physical downlink control channel (PDCCH) having an uplink grant.

* * * * *